(12) United States Patent
Kopansky et al.

(10) Patent No.: US 10,222,251 B2
(45) Date of Patent: Mar. 5, 2019

(54) ELECTRO-OPTIC LIQUID SENSOR ENABLING IN-LIQUID TESTING HAVING A LIGHT SOURCE PROVIDING A PLURALITY OF INTENSITIES FOR ASSESSING AN OPERATIONAL STATE OF THE SENSOR

(71) Applicant: EATON CORPORATION, Cleveland, OH (US)

(72) Inventors: Gregory Kopansky, Philadelphia, PA (US); Rolland James, Collingswood, NJ (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 14/912,747

(22) PCT Filed: Sep. 9, 2014

(86) PCT No.: PCT/US2014/054696
§ 371 (c)(1),
(2) Date: Feb. 18, 2016

(87) PCT Pub. No.: WO2015/038514
PCT Pub. Date: Mar. 19, 2015

(65) Prior Publication Data
US 2016/0202108 A1    Jul. 14, 2016

Related U.S. Application Data

(60) Provisional application No. 61/875,892, filed on Sep. 10, 2013.

(51) Int. Cl.
*G01F 23/292* (2006.01)

(52) U.S. Cl.
CPC ........ *G01F 23/292* (2013.01); *G01F 23/2922* (2013.01)

(58) Field of Classification Search
CPC ............... G01F 23/2922; G01F 23/292; G01F 23/2928; G01N 2035/1025
(Continued)

(56) References Cited

U.S. PATENT DOCUMENTS 3,065,354 A  *  11/1962  Bird ..................... G01F 23/2927
250/577
4,354,180 A     10/1982  Harding
(Continued)

FOREIGN PATENT DOCUMENTS

EP    0753411 A2    1/1997
JP    2009014660 A  1/2009
WO   99/35471 A1    7/1999

OTHER PUBLICATIONS

European Patent Office; International Search Report and Written Opinion issued in corresponding International Application No. PCT/US2014/054696, dated Nov. 19, 2014.

*Primary Examiner* — Que T Le
(74) *Attorney, Agent, or Firm* — Fishman Stewart PLLC

(57) ABSTRACT

An electro-optic liquid sensor may include a light source, an light detector, a prism, and a reflective optical member. The optical member may be arranged to reflect light emitted by the light source to the light detector when a liquid is disposed between the light source and the optical member. The electro-optic sensor may enable assessment of its operational state in the presence of liquid, thus improving on known electro-optic liquid sensors.

8 Claims, 3 Drawing Sheets

(58) Field of Classification Search
USPC .................................. 250/577, 573, 221, 216
See application file for complete search history.

(56) References Cited

U.S. PATENT DOCUMENTS 5,514,920 A    5/1996  Key
6,049,088 A *  4/2000  Harding .............. G01F 23/2925
                                                    250/577

* cited by examiner

ELECTRO-OPTIC LIQUID SENSOR ENABLING IN-LIQUID TESTING HAVING A LIGHT SOURCE PROVIDING A PLURALITY OF INTENSITIES FOR ASSESSING AN OPERATIONAL STATE OF THE SENSOR

CROSS-REFERENCE TO RELATED APPLICATION

This application claims the benefit of U.S. Provisional Patent Application No. 61/875,892, filed Sep. 10, 2013, which is hereby incorporated by reference as though fully set forth herein.

BACKGROUND

1. Technical Field

The present disclosure relates generally to liquid sensors, including electro-optic liquid sensors.

2. Description of the Related Art

Numerous components in numerous different fields are dependent on the presence or absence of liquid, or a certain amount of liquid. Accordingly, sensors have been developed for detecting the presence of fluid. One known sensor type is an electro-optic sensor including a light source, a prism, and a light detector.

In known electro-optic liquid sensors, light emitted from the light source may be returned to the light detector by the prism only if no liquid is present. If liquid is present, no light may be returned to the light detector.

SUMMARY

An embodiment of an electro-optic liquid sensor may include a light source, an light detector, a prism, and a reflective optical member (which may also be referred to as an optical shield). The optical member may be arranged so as to reflect light emitted by the light source to the light detector when a liquid is disposed between the light source and the optical member.

Liquid sensors according to the present disclosure may improve on known electro-optic liquid sensors by providing capability for assessing the operational state of the sensor in the presence of liquid. In contrast, known electro-optic sensors are generally only capable of being tested while not in liquid. Accordingly, electro-optic sensors according to the present disclosure may enable improved testing and functionality over known electro-optic liquid sensors.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
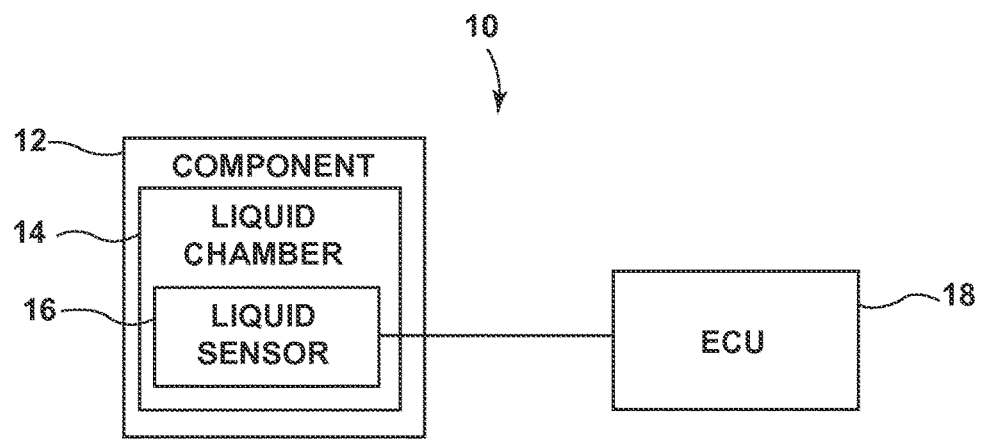
FIG. 1 is a block diagram view of an exemplary embodiment of a system including a component for which determining the presence of fluid may be desireable.

Referring to the figures, in which like reference numerals refer to the same or similar features in the various views, FIG. 1 is a block diagram view of a system 10 including a component 12 for which determining the presence of liquid may be desirable. The component 12 may include a liquid chamber 14, and the system 10 may further include a liquid sensor 16 and an electronic control unit (ECU) 18.

The component 12 may be any component in any field that includes or may be exposed to liquid in its operation. For example, the component 12 may be or may be included in a mechanical, electrical, hydraulic, pneumatic, or other known actuator or actuation system. The component 12 may include a liquid chamber 14 configured to store or receive a liquid. The liquid may be, for example only, of a type necessary for the functionality of the component 12 (e.g., hydraulic fluid, liquid for lubrication, fuel, etc.), liquid incidental to the environment of the component 12, and/or liquid that is detrimental to the function of the component 12.

The liquid sensor 16 may be coupled with the component 12. For example, the liquid sensor 16 may be disposed within the liquid chamber 14 of the component 12. The liquid sensor 16 may be an electro-optic sensor according to the present disclosure, such as that described in conjunction with FIGS. 2-4.

With continued reference to FIG. 1, the ECU 18 may be electrically coupled to the sensor 16 and may be configured to drive the sensor 16, receive feedback from the sensor 16, assess whether liquid is present or absent in the liquid chamber 14, and/or assess the operational state of the sensor 16. The ECU 18 may comprise, in embodiments, one or more of a processor, a non-volatile computer-readable memory, an application-specific integrated circuit (ASIC), field-programmable gate array (FPGA), and/or other known processing or memory device. The ECU 18 may be or may comprise a dedicated processing resource for the sensor 16, or may be or may comprise processing resources for numerous sensors, components, and/or systems. The ECU 18 may be electrically coupled to the sensor 16 through known wired and/or wireless connections.

Figure 2:
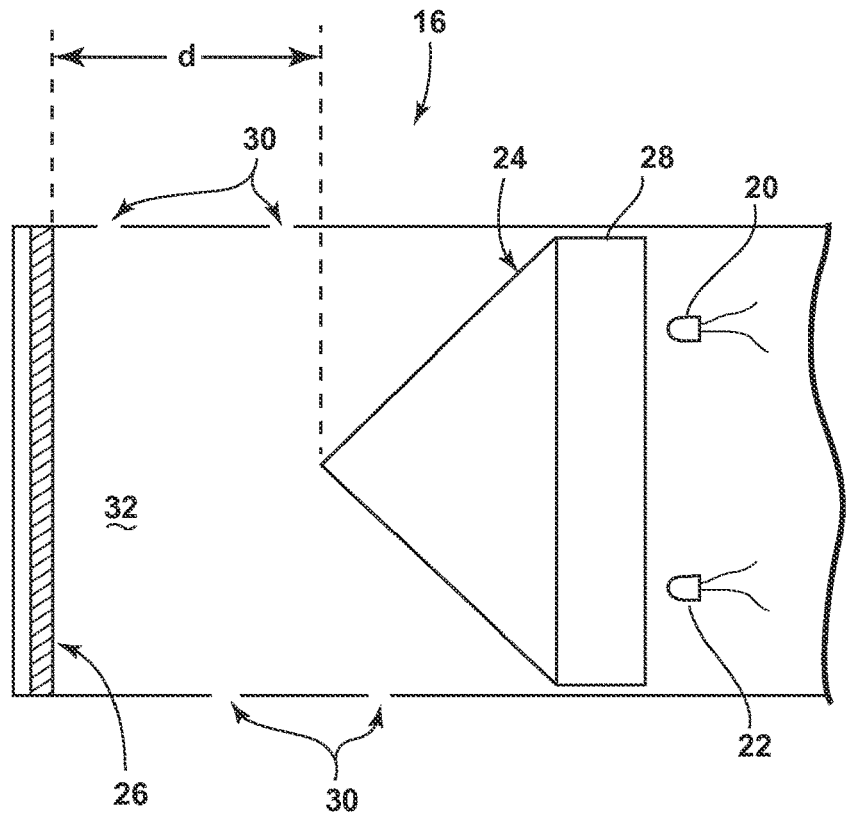
FIG. 2 is a diagrammatic view of an exemplary embodiment of an electro-optic liquid sensor.

FIG. 2 is a diagrammatic view of an exemplary embodiment of the electro-optic liquid sensor 16. The sensor 16 may include a light source 20, a light detector 22, a prism 24, and a reflective optical member 26 (which may also be referred to as an optical shield), which may be generally disposed within a housing 28. The housing may include one or more liquid ports 30 for permitting liquid to flow into and out of a chamber 32 of the housing 28. The chamber 32 may define a gap between the prism 24 and the optical member 26 of a size d. In an embodiment, d may be about an inch or less. Of course, other dimensions may be employed as appropriate for particular applications.

The light source 20 may be configured to emit light of a chosen frequency and power (or powers) appropriate for a given application (i.e., appropriate for the characteristics of the other elements of the sensor, such as shape, orientation, materials, reflectivity, etc., and/or according to characteristics of the liquid to be detected, such as density, scattering properties, etc.). As used herein, a light frequency should be understood to include either or both of a specific frequency of light and a frequency band. In an embodiment, the light source 20 may be configured to emit light in the infrared portion and/or the near-infrared portion of the electromagnetic spectrum. The light source 20 may be or may include one or more of a light-emitting diode (LED), a laser, or other known light source, in an embodiment.

The light detector 22 may be configured, in an embodiment, to detect light of one or more frequencies of light, including at least the frequency of light emitted by the light source 20. The light detector 22 may be or may include one or more of a phototransistor, photodiode, and/or other known light detecting device.

The prism 24 may be a member, article, or device comprising one or more components configured in size, shape, and materials to reflect a light signal from the light source 20 to the light detector 22 in certain conditions and to pass light from the light source 20 through the prism 24 in certain conditions. For example only, the prism may be configured to reflect light from the light source 20 to the light detector 22 when liquid is not present around the prism 24, and to pass light from the light source through the prism 24 when liquid is present around the prism 24. In an embodiment, for example only, the prism 24 may comprise borosilicate glass, fused silica (quartz), one or more polymers, etc, that is optically transmissive at least to light of the frequency emitted by the light source 20. Thus, in an embodiment, the prism 24 may be optically-transmissive to light in the infrared and/or near-infrared portions of the electromagnetic spectrum, for example only.

The reflective optical member 26 may be arranged and configured to reflect light emitted by the light source 20 to the light detector 22, in certain conditions. The optical member 26 may have a degree of reflectivity for one or more frequencies of light that is tailored for a particular application. In certain embodiments, the optical member 26 may have complete or near-complete reflectivity for the frequency of light emitted by the light source 20. In other embodiments, the optical member 26 may have less-than-complete reflectivity for the frequency of light emitted by the light source 20.

The reflective optical member 26 may be disposed, in an embodiment, on a side of the housing 28 opposite the light source 20 and the light detector 22. The light source 20 may emit light in the direction of the optical member 26. The prism 24 may be disposed between the light source 20 and the optical member 26, in an embodiment, and between the light detector 22 and the optical member 26, in an embodiment. Accordingly, in the embodiment generally illustrated in FIG. 2, light may travel from the light source 20, through the prism 24, through the chamber 32, to the optical member 26, and be reflected by the optical member 26 back through the chamber 32 and prism 24 to the light detector 22, in certain conditions. The distance d between the optical member 26 and the prism 24 may be tailored to the geometric relationship between the optical member 26, prism 24, light detector 22, and light source 20, in an embodiment, for the optical member 26 to effectively reflect light emitted by the light source 20 to be returned to the light detector 22.

Figure 3:
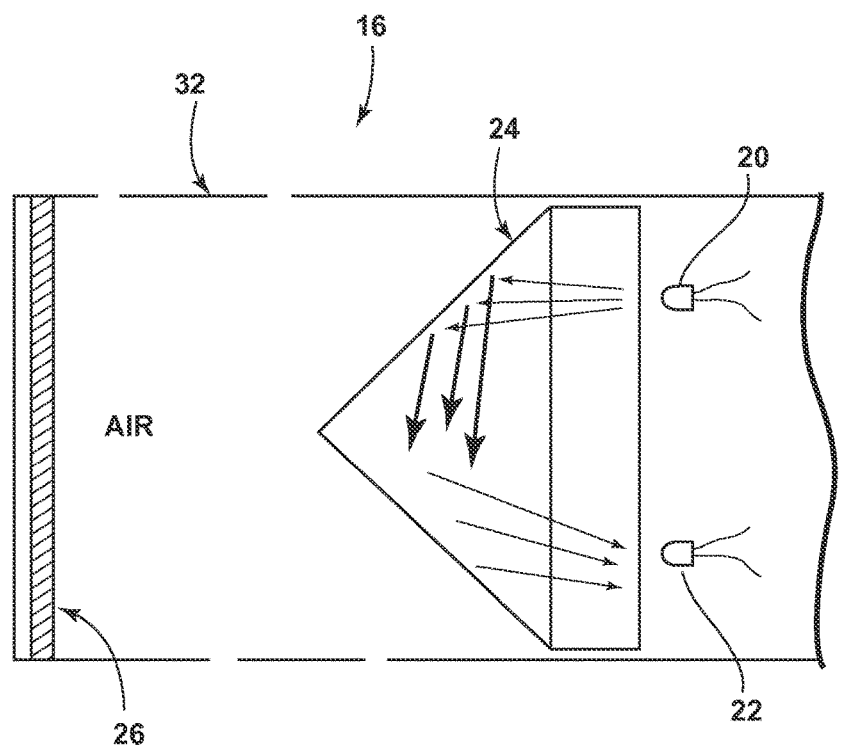
FIG. 3 is a diagrammatic view of the electro-optic liquid sensor of FIG. 2 illustrating the operation of the liquid sensor in the absence of liquid.
Figure 4:
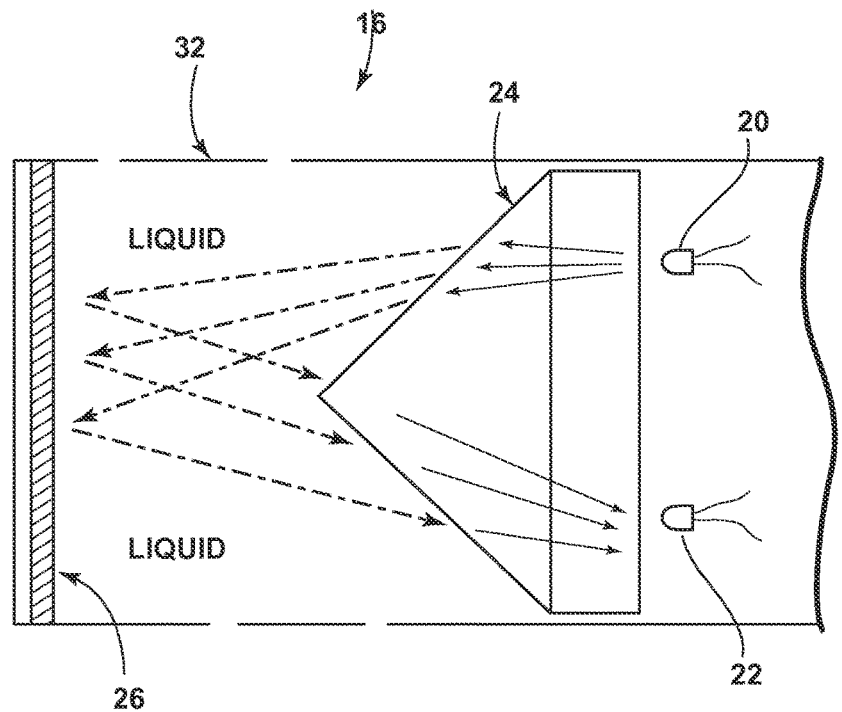
FIG. 4 is a diagrammatic view of the electro-optic liquid sensor of FIG. 2 illustrating the operation of the liquid sensor in the presence of liquid.

The electro-optic liquid sensor 16 may be configured to detect the presence of liquid by returning a different amount of light from the light source 20 to the light detector 22 when liquid is present in the chamber 32 than when liquid is not present in the chamber 32. For example, as shown in FIG. 3, when no liquid is present in the chamber 32, and the chamber 32 is filled with air, the prism 24 may return a first amount of light from the light source 20 to the light detector 22. In an embodiment, the prism 24 may return substantially all light emitted by the light source 20 to the light detector 22 when no liquid is present. In contrast, as shown in FIG. 4, when the chamber 32 is filled with liquid, the prism 24 may return very little of or none of the light from the light source 20 to the light detector 22. The prism 24 may pass some portion of the light emitted by the light source 20, some of which light may disperse in the liquid, and some of which light may propagate to the optical member 26, be reflected by the optical member 26 to the light detector 22, and be received by the light detector 22. Accordingly, a relatively higher amount of light received by the light detector 22 may be associated with the absence of liquid from the chamber 32, and a relatively smaller amount of light received by the light detector 22 may be associated with the presence of liquid in the chamber 32.

The electro-optic liquid sensor 16 may improve on known electro-optic sensors by enabling the sensor 16 to be tested in the presence of liquid. Known electro-optic sensors generally do not provide any means by which a light signal may be returned to the light detector in the presence of liquid. As a result, a faulty sensor may be indistinguishable from the presence of liquid in known sensors. In contrast, because the electro-optic sensor 16 of the present disclosure may return a light signal to the light detector 22 in the presence of liquid, a faulty sensor (which may indicate zero light received by the light detector 22) may be distinguished from the presence of fluid (which may indicate a nonzero amount of light received by the light detector, but less light received by the light detector 22 than when liquid is absent).

Although embodiments of the electro-optic liquid sensor 16 are described herein with respect to particular materials, shapes, dimensions, light characteristics, etc., it should be understood that such details are exemplary only and are not limiting except as explicitly recited in the claims. Numerous modifications and alterations may be made within the spirit and scope of the present disclosure.

Referring to FIGS. 1 and 2, the ECU 18 may be configured to operate the electro-optic sensor 16 to determine whether liquid is present in the chamber 32 and to determine whether the sensor 16 is or is not operating properly (i.e., assess the operational state of the sensor 16). Accordingly, in an embodiment, the ECU 18 may be configured to operate the sensor 16 in a liquid detection mode and a test mode. The liquid detection mode and the test mode may be implemented separately by the ECU, or may be implemented together.

Figure 5:
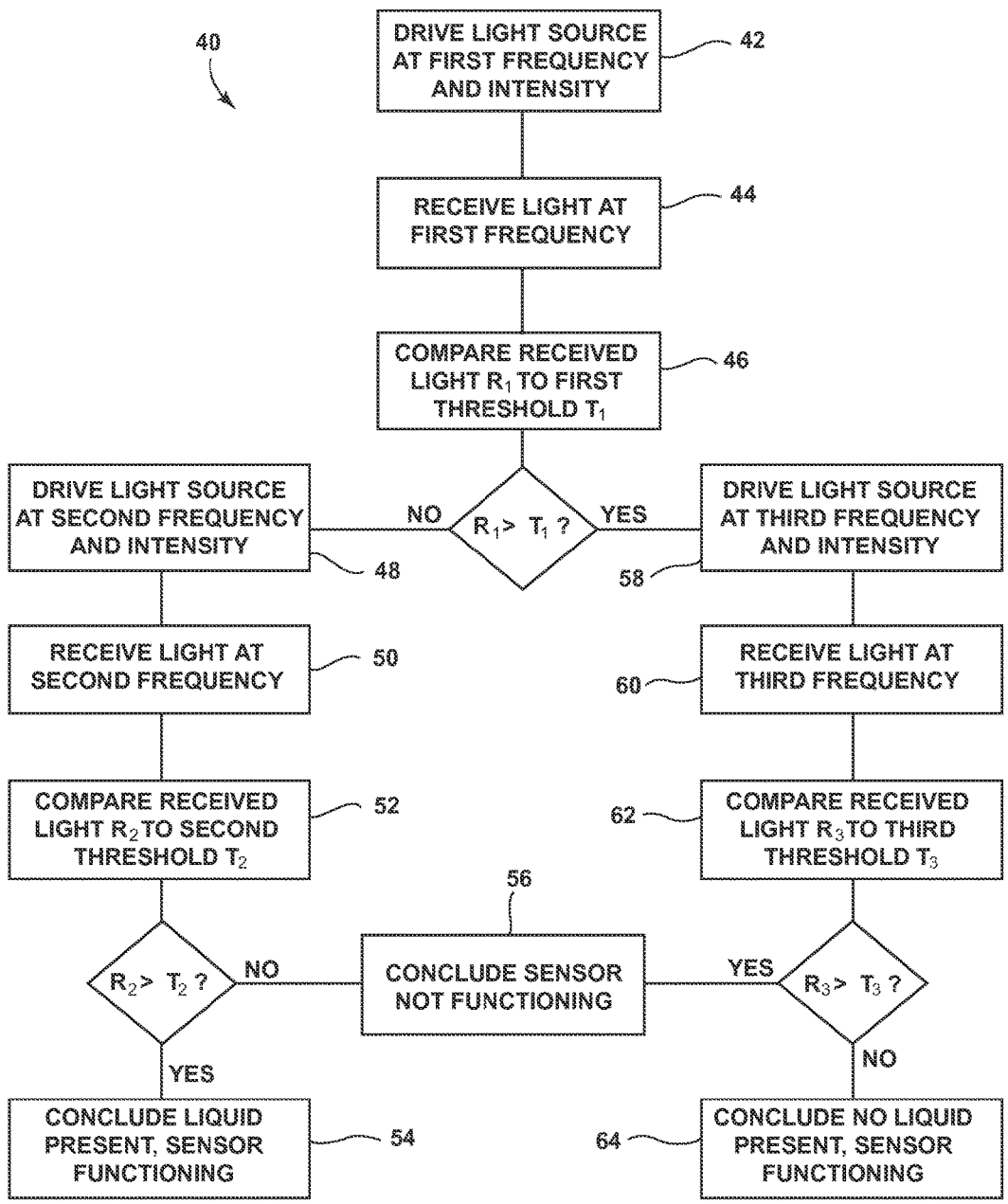
FIG. 5 is a flow chart illustrating an embodiment of a method of operating an electro-optic liquid sensor.

FIG. 5 is a flow chart generally illustrating a method 40 of operating an electro-optic sensor 16. One or more steps of the method 40 may be performed by the ECU 18 shown in FIG. 1 to operate the sensor 16 of FIG. 2. The method 40 may include steps for implementing a liquid detection mode and a test mode of the electro-optic sensor together.

Referring to FIGS. 2 and 5, an embodiment of a method 40 may begin with a first driving step 42 that includes driving the light source 20 at a first frequency and intensity. The frequency and intensity may be selected according to the characteristics of the components of the sensor 16 and according to the liquid to be detected. The method 40 may continue to a first receiving step 44 that includes receiving reflected light with the light detector 22. The received light may be of the same frequency as that emitted by the light source 20 in the first driving step 42. In a first comparison step 46, the amount or intensity or light received, $R_1$, may be compared to a first threshold, $T_1$.

If the amount or intensity of light detected in the first receiving step 44 is less than the first threshold $T_1$, the method 40 may continue to a second driving step 48 that includes driving the light source 20 at a second frequency and intensity. The second frequency may be the same as the first frequency, in an embodiment. The second intensity may be the same as the first intensity, in an embodiment. In another embodiment, the second frequency and/or intensity may be different from the first frequency and/or intensity. For example only, the second intensity may be higher than the first, in an embodiment. A higher intensity may be used in the second driving step 48 than in the first driving step 42 to ensure that, if liquid is present, the light will have sufficient energy to propagate through the liquid from the light source 20 to the optical member 26 and back to the light detector 22. Thus, as in the first driving step 42, the frequency and intensity of light in the second driving step 48 may be selected according to the type of liquid to be detected and the characteristics of the elements of the sensor.

The method 40 may continue to a second receiving step 50 that includes receiving reflected light with the light detector 22. The received light may be of the same frequency as that emitted by the light source 20 in the second driving step 48. In a second comparison step 52, the amount or intensity or light received, $R_2$, may be compared to a second threshold, $T_2$. If the amount or intensity of light received is greater than the second threshold (i.e., if $R_2 > T_2$), it may be concluded at a first conclusion step 54 that liquid is present and that the sensor 16 is functioning properly. If the amount or intensity of light received $R_2$ is not greater than the second threshold $T_2$, it may be concluded at a second conclusion step 56 that the sensor 16 is not functioning properly.

In the first comparison step 46, if the amount or intensity of light received is greater than the first threshold (i.e., if $R_1 > T_1$), the method 40 may advance to a third driving step 58 that includes driving the light source 20 at a third frequency and intensity. The third frequency may be the same as either or both of the first frequency and the second frequency, in an embodiment. The third intensity may be the same as either or both of the first intensity and the second intensity, in an embodiment. In another embodiment, the third frequency and/or intensity may be different from either or both of the first and second frequency and/or intensity. The frequency and intensity of light in the third driving step 58 may be selected according to the type of liquid to be detected and the characteristics of the elements of the sensor.

The method 40 may continue to a third receiving step 60 that includes receiving reflected light with the light detector 22. The received light may be of the same frequency as that emitted by the light source 20 in the third driving step 58. In a third comparison step 62, the amount or intensity or light received, $R_3$, may be compared to a third threshold, $T_3$. The third threshold $T_3$ may be set to an amount or intensity of light that is higher than a properly-functioning sensor could detect given the amount or intensity of light emitted in the third driving step 58. If the amount or intensity of light received is less than the third threshold, it may be concluded at a third conclusion step 64 that no liquid is present and that the sensor 16 is functioning properly. If the amount or intensity of light received $R_3$ is greater than the third threshold $T_3$, it may be concluded again at the second conclusion step 56 that the sensor 16 is not functioning properly.

The thresholds $T_1$, $T_2$, $T_3$ for determining whether liquid is present and whether the sensor 16 is functioning properly may be selected according to the characteristics of the liquid to be detected and the characteristics of the elements of the sensor 16, in an embodiment. Additionally or alternatively, the thresholds $T_1$, $T_2$, $T_3$ may be experimentally determined.

The steps of the method 40 may be performed repeatedly, in an embodiment, to assess whether liquid is present and whether the sensor 16 is functioning properly on an ongoing basis. That is, a continuous loop of driving the light source 20, receiving light with the light detector 22, and comparing the amount or intensity of light received to one or more thresholds may be executed. In an embodiment in which the first, second, and third driving steps 42, 48, 58 utilize the same frequency and intensity of light, the light source 20 may be continuously driven at a single frequency and intensity.

In an alternate embodiment, the third driving, receiving, and comparing steps 58, 60, 62 may be omitted and, if the first amount of received light $R_1$ is greater than the first threshold $R_2$, it may be concluded that no liquid is present.

The first driving, receiving, and comparing steps 42, 44, 46 may be considered steps in an embodiment of a method of assessing the presence of liquid (i.e., a liquid detection mode). The second and third driving, receiving, and comparing steps 48, 50, 52, 58, 60, 62 may be considered steps in an embodiment of a method of assessing the operational state of the sensor (i.e., a testing mode). The liquid presence assessment method may be performed separately and independently from the operational state assessment method, in an embodiment. For example, the operational state assessment method steps 48, 50, 52, 58, 60, 62 may be performed on a less-frequent basis than the liquid presence assessment steps 42, 44, 46, in an embodiment. Furthermore, although the method 40 is illustrated and described such that the operational state assessment steps 48, 50, 52, 58, 60, 62 are only performed after performing the liquid presence assessment steps 42, 44, 46, such description and illustration is exemplary only. In an embodiment, the operational state assessment steps 48, 50, 52, 58, 60, 62 may be performed regardless of performance of the liquid presence assessment steps 42, 44, 46.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed:
1. A sensor, comprising:
a light source;
a light detector;
a prism; and
a reflective optical member,
wherein the reflective optical member is arranged to reflect light emitted by the light source to the light detector and the light source is configured to provide light at a plurality of intensities for assessing an operational state of the sensor.

2. The sensor of claim 1, wherein the light source is configured to emit light in the infrared or near-infrared portion of the electromagnetic spectrum.

3. The sensor of claim 1, wherein the prism is arranged so as to reflect light emitted by the light source to the light detector when liquid is not present between the light source and the optical member.

4. The sensor of claim 1, wherein the prism is disposed between the light source and the optical member and between the optical member and the light detector.

5. The sensor of claim 1, wherein the plurality of intensities includes a first intensity, a second intensity, and a third intensity; and the first intensity, the second intensity, and the third intensity are different from each other.

6. The sensor of claim 5, wherein the second intensity is configured to ensure that light from the light source will have sufficient energy to propagate from the light source through liquid to the reflective optical member and back to the light detector.

7. The sensor of claim 1, including a housing, wherein the light source, the light detector, the prism, and the optical member are disposed within the housing, and the optical member has less-than-complete reflectivity.

8. The sensor of claim 7, wherein the housing comprises two or more ports configured to admit liquid into the housing.

* * * * *